Dec. 22, 1970   H. W. COLE, JR   3,548,654
TRUE AIR SPEED METER WITH RELATIVE WIND DIRECTION
Filed Feb. 10, 1969   2 Sheets-Sheet 1
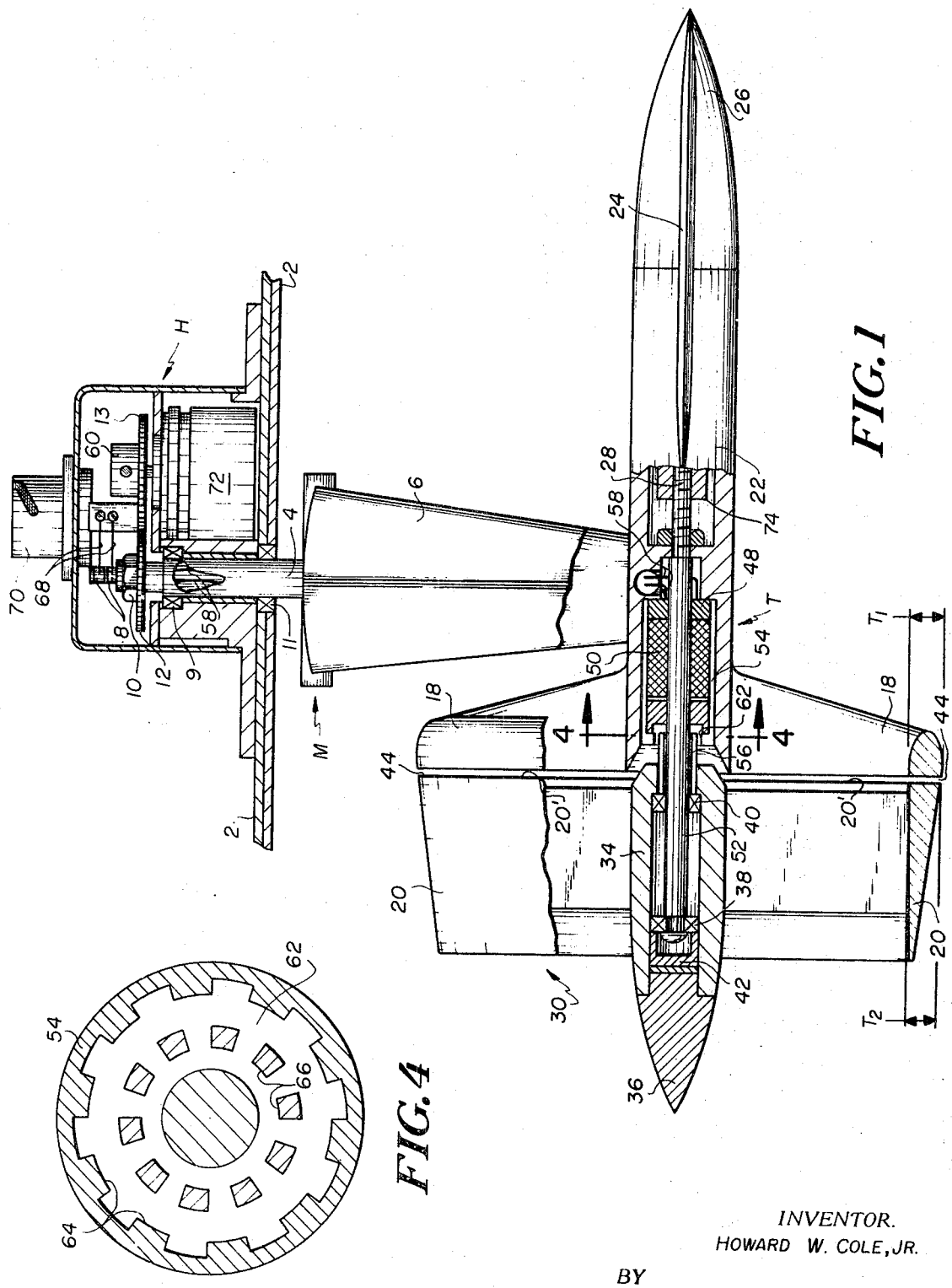
INVENTOR.
HOWARD W. COLE, JR.
BY
*Richard Spinelli*
ATTORNEYS Dec. 22, 1970   H. W. COLE, JR   3,548,654
TRUE AIR SPEED METER WITH RELATIVE WIND DIRECTION
Filed Feb. 10, 1969   2 Sheets-Sheet 2
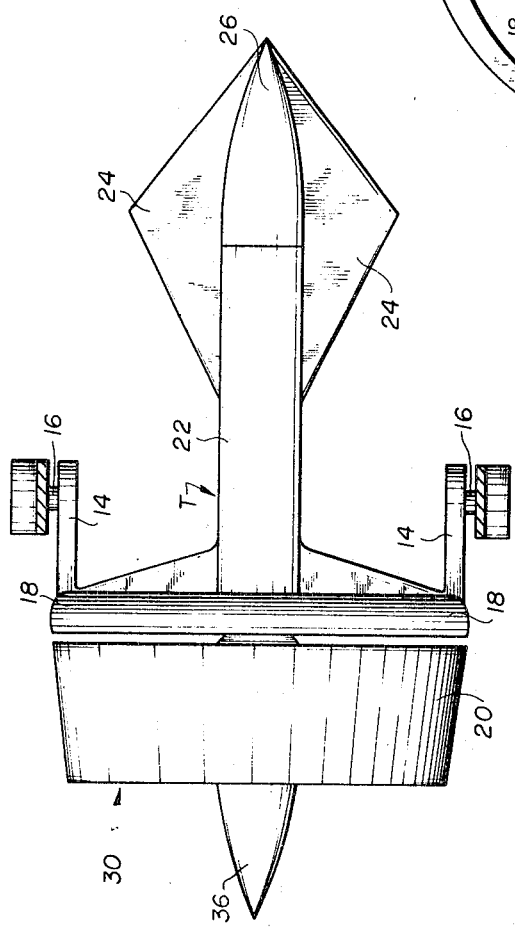
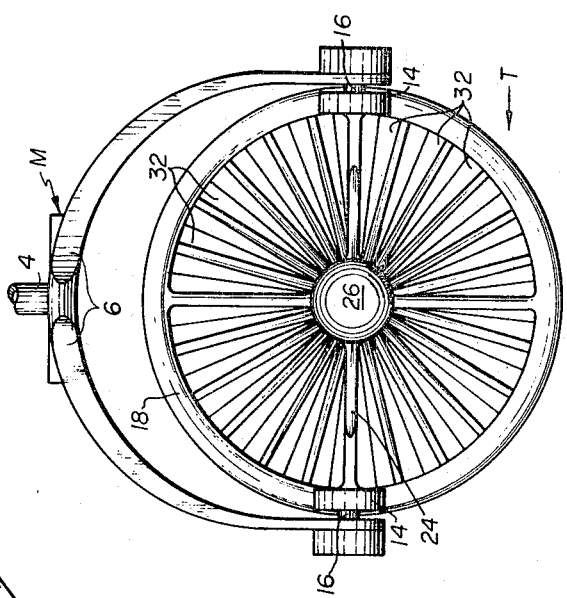
INVENTOR.
HOWARD W. COLE, JR.
BY
ATTORNEYS

United States Patent Office 3,548,654
Patented Dec. 22, 1970

3,548,654
TRUE AIR SPEED METER WITH RELATIVE WIND DIRECTION
Howard W. Cole, Jr., 12 Vale Drive,
Mountain Lakes, N.J. 07046
Filed Feb. 10, 1969, Ser. No. 797,742
Int. Cl. G01p 5/06
U.S. Cl. 73—187     10 Claims

ABSTRACT OF THE DISCLOSURE

A novel apparatus and method for measuring, under widely variable speed and air flow conditions, the true air speed of any aircraft having an air flow therearound, includes a shrouded turbine rotor having a plurality of blades, a fixed shroud axially aligned with and slightly spaced from the turbine shroud, a magnetic pick-up assembly for conversion of the rotor speed to electrical pulses for the ultimate air speed measurement and a mounting assembly to afford rotation of the air speed meter around axes corresponding to the pitch and yaw axes of the aircraft. In operation, the turbine is rotated by the movement of the air over its blades and a partial vacuum is created in the gap between the rotating and fixed shrouds, thus offsetting axial forces acting on the rotating shroud and reducing friction on its bearings, while the air speed meter assembly is deflected about its mounting under the influence of the transverse air forces acting on it. The magnetic pick-up assembly employs a variable air space to effectuate reluctance change to convert the rotation of the turbine to electrical pulses and transmits these pulses to a measuring apparatus in the aircraft which records the vehicle speed.

BACKGROUND OF THE INVENTION

Field of the invention

The present invention relates generally to a device for measuring the speed and direction of a fluid with respect to a reference point. It has application in measuring the speed of a vehicle passing through a fluid or the speed of fluid flow passing over an object. More particularly, the present invention has been found to be especially suitable for measuring the true air speed of an aircraft and the direction of the wind acting on the aircraft.

Description of the prior art

At present, there are two basic types of air speed indicating devices. One type of air speed indicator is generally characterized as the Pitot or Venturi tube type which depends upon the measurement and comparison of static and dynamic pressures to determine relative air speed. The other type is that of an air screw or air turbine which measures air speed by the rate of rotation of a screw or turbine which measures air speed by the rate of rotation of a screw or turbine driven by the air flow.

In the case of the Pitot tube type air speed meter in which dynamic and static pressures are measured, any change in the density of the air resulting, for example, from a change in altitude or temperature, will affect the reading of the device, thus requiring compensation.

The air screw or turbine speed meters, on the other hand, suffer from the disadvantage that a portion of air flow energy which should contribute to the speed of the turbine is generally lost due to "internal" and "external" loads on the turbine. The energy loss due to "external" load results from the expenditure of energy in overcoming the frictional forces of the bearings and the resisting torque of the speedometer device used to detect and convert the turbine rotation to a speed reading. The "internal" load on the turbine type air speed meter is due to the frictional force of the air as it adheres to any surface over which it passes and the drag force which attends any airfoil providing lift.

The "external" loads are mechanical in nature and can be at least partially overcome by the provision of precision bearings having very little friction associated therewith, and measuring devices which impose a minimum of torque on the turbine blade assembly.

The "internal" load component has been virtually impossible to negate until the present invention. A drag force inherently attends any aerodynamic surface over which an air flow is passed. Consequently, when a cambered or skewed turbine blade is used to provide a surface on which a force can act to rotate the turbine shaft, drag and frictional forces are necessarily created. In the past, various compensating devices have been employed to counterbalance the drag forces inherently encountered in air screw type air speed indicators, however, such devices require the imposition of an artificial force to compensate for the unwanted load on the air screw. A typical system of this type designed to compensate for aerodynamic energy loss in turbine type air speed meters is described in Mercier et al. U.S. Pat. 2,355,921. In the air speed meter of the Mercier et al. system, energy from an external source is supplied to the meter in such a manner as to balance its frictional losses due to the angle of incidence of the air against the turbine blades.

The major problem associated with turbine type air speed meters, however, is that the internal and external loads referred to above vary in magnitude with the conditions under which the air speed meter is used. For example, the loads produced by operation of a helicopter traveling at very low speed in quiet air are markedly less than those of a jet aircraft traveling at or faster than the speed of sound. The great difficulty of providing mechanical means to obviate frictional forces on the bearings of an air speed meter due to the internal and external load forces exerted under such widely varying conditions of use, will be apparent to those skilled in the art.

Typically, air speedometers are provided with apparatus to provide a correctional characteristic in the signal received from the air speed meter. This correction is generally a complex function of many variables and, therefore, its determination is difficult and requires expensive equipment.

It has also been suggested previously to minimize drag and frictional forces in turbine type air speed meters, to incorporate means for adjusting the pitch of the blades, and also to employ mechanical gear reduction ratio features in the metering device.

In addition, the prior art fails to provide a device combined with a true air speed meter which immediately detects any change in wind direction or velocity while an aircraft is traveling at low speed or hovering.

It is a primary object of the present invention to provide a turbine type true air speed meter which is capable of accurately indicating true air speed under widely varying conditions of use and particularly over a wide range of air speeds.

It is another object of the present invention to provide a turbine type true air speed meter with means for automatically providing a variable, opposite and substantially equal force opposing the internal and external forces acting on the turbine to minimize friction on the turbine bearings.

Another object of the invention is to provide an air turbine type true air speed meter which generates a negative pressure on the leading edge of an air turbine to compensate for the "internal" and "external" forces on the air turbine.

It is a further object to provide an air speed meter which will automatically indicate the wind direction by orienting itself to face the direction from which the resultant of the air flow and wind forces approaches.

A still further object of the present invention is to provide an inexpensive air speed meter capable of reliably determining with accuracy the air speed of an aircraft, and which does not require the direct application of compensating forces to convert relative air speed to true air speed.

A still further object of the present invention is to provide a highly sensitive and accurate means for converting the rotation of the turbine of an air speed meter to electrical impulses.

It is another object of the present invention to provide a device capable of measuring both the true air speed of an aircraft and the direction of the wind acting on it.

SUMMARY OF THE INVENTION

To this end, a true air speed meter of the turbine type has been provided which is adapted to orient itself in the direction of the resultant of air flow forces under both cruising and hovering conditions, and which comprises a turbine assembly which projects into the airstream, and a housing adapted to accommodate electrical circuitry and other components associated with the true air speed meter. The housing is rigidly mounted on the frame of the aircraft while the turbine assembly is attached to the housing by a rotatable mounting means adapted to afford limited movement of the entire section around an axis parallel to the transverse axis of the aircraft and unlimited movement around an axis parallel to the vertical axis of the aircraft. The turbine assembly section includes a shrouded air turbine and has integrally formed therewith an aerodynamically shaped shroud member arranged in axial alignment with and slightly spaced from the air turbine shroud. The combined cross sectional shape of the fixed and rotating shrouds is that of an aerodynamic surface at every location, however, an annular gap is provided between the fixed and rotating shrouds. Consequently, in operation, air flowing over the composite fixed and rotating shroud assembly generates a negative pressure in the annular gap between the rotating and fixed shrouds. By this action, a negative force is provided which acts on the rotating shroud to compensate for the positive forces on the turbine caused by the aerodynamic drag on the hub, rotating shroud and blades of the turbine. In addition, the turbine assembly is provided with bullet-shaped center bodies both fore and aft of the air turbine to optimize the air flow in the environment of the turbine.

BRIEF DESCRIPTION OF THE DRAWINGS

FIG. 1 is a vertical cross sectional view taken through the longitudinal axis of the air speed meter of the present invention;

FIG. 2 is a top plan view of the air speed meter of FIG. 1;

FIG. 3 is a front elevational view of the air speed meter shown in FIG. 1;

FIG. 4 is a cross sectional view taken along line 4—4 of FIG. 1.

DESCRIPTION OF THE PREFERRED EMBODIMENTS

The true air speed meter of the present invention as shown in FIG. 1 comprises a housing H, a turbine assembly T and a turbine mounting assembly M. The housing H is shown mounted inside a vehicle, such as an aircraft, on the frame 2 by conventional fastening means. The turbine assembly T and much of the turbine mounting assembly M is disposed outside of the frame 2 in the airstream passing around the aircraft. A hollow shaft 4, forming a part of the turbine mounting assembly M, extends upwardly through a suitable aperture in the frame 2 of the aircraft, and is journaled for rotation in a suitable bearing means mounted within the housing H. The turbine mounting assembly M also includes a yoke 6 having two arms, in addition to the hollow shaft 4, one end of which shaft is fixedly connected to the central portion of the yoke 6. An intermediate portion of the shaft 4 is engaged by the inner race of a bearing 11 the outer race of which is mounted in the frame 2. The upper end of shaft 4 is steadied in guide bearing 9. The gear 12 mounted on an extension of shaft 4, engages gear 13 of synchro unit 72 to transmit the rotary motion of shaft 4 thereto. Nut 10 secures gear 12 on the extension of shaft 4. In this way, the shaft 4 and yoke 6 of the turbine mounting assembly M are mounted in the housing H so as to permit 360° rotation of the shaft 4, yoke 6 and turbine with respect to the aircraft. The legs and central portion of the yoke 6 are hollow and an aperture (not shown) in the central portion of the yoke communicates with the hollow interior of the shaft 4. The extension of shaft 4 being hollow, communication is provided between the hollow central portion of the yoke 6 and the upper interior of housing H through shaft 4.

As best seen in FIG. 2 the lower extremities of the arms of the yoke 6 are connected to support arms 14 by suitable pivot means 16. The turbine assembly T is mounted between said support arms 14 which are fixedly attached to the stationary shroud 18 of the turbine assembly. In this manner, the turbine assembly T is supported in the airstream passing the aircraft in such a way that, as noted above, it is free to rotate 360° with respect to the vertical axis of the aircraft (or an axis parallel thereto) by virtue of the free rotation of shaft 4 in the bearing means in housing H, and also to pivot to a limited degree within the yoke 6 with respect to the transverse axis of the aircraft (or an axis parallel thereto).

The housing H also contains a conventional synchro unit 72, driven by gears 12 and 13, to sense the rotational movement which the shaft 4 makes with respect to the housing on rotation of the turbine assembly T, and part of the electrical circuitry of the electro-magnetic transducer employed to measure the air speed. A typical synchro unit which may be utilized in the air speed meter of the present invention is the synchro control transmitter manufactured by General Precision, Inc. of Little Falls, N.J.

The turbine assembly T includes a stationary shroud 18, a rotatable shroud 20, a body 22 and stabilizing or balancing fins 24. The body 22 includes a forward extension terminating in a bullet-shaped center body or nose section 26 aligned axially with the rotatable shroud 20. Functionally, the nose section 26 of the body 22 serves to effect a gradual separation of the air flow approaching the turbine and thereby reduces turbulence in the vicinity thereof. For production and assembly purposes, the nose section 26 is formed separately from the remainder of the body 22 and is mounted thereon by means of a threaded base which may be screwed onto the threaded end of a rod 28 which extends through the body 22 to mount the turbine at its opposite end. A counter-balance weight 74 is threaded on the rod 28 within the body 22, for axial adjustment forwardly or rearwardly as necessary to balance the turbine assembly T with respect to the moments about the axis of pivot means 16.

The rotating turbine 30 consisting of the rotatable shroud 20 and turbine blades 32 is mounted on the rod 28 directly behind the fixed shroud 18. More specifically, the turbine 30 is comprised of a plurality of skewed plastic blades 32, a continuous plastic shroud 20 attached to the tips of the blades 32 and a turbine hub 34. The blades 32 provide the surfaces against which the fluid flow acts to rotate the turbine 30, while the shroud 20 acts as both a fin to keep the turbine 30 facing the resultant of the fluid flow forces and a converter to produce drag compensating force. This shroud 20 also mechanically supports and protects the turbine blades allowing use of thinner blades having less drag. The turbine hub 34 is provided with an aft bullet-shaped section 36 which gives the hub assembly a streamlined shape. It should be noted that the preferred material for the blades 32 and the turbine shroud 20 is a molded plastic of the acetal type of which a suitable example is available from E. I. du Pont de Nemours & Co. under the trademark "Delrine."

The turbine 30 is mounted for rotation on ball bearing assemblies 38 and 40, the outer bearing races being rigidly attached to the interior of the turbine hub 34, while the inner bearing races are rigidly attached to the turbine mounting rod 28. Spacer means 42 are provided to position the turbine hub 34 with respect to the bearing assembly 38. As seen in FIG. 1, the turbine mounting rod 28 extends through the body 22 to the nose section 26 as described above.

The fixed shroud 18 is axially aligned with the rotating shroud 20 of the turbine 30 and arranged therewith to provide a gap 44 therebetween. The presence of the gap 44 between the fixed shroud 18 and the rotating shroud 20 facilitates the generation of a negative pressure at the leading edge 20' of the rotating shroud 20. Functionally, the negative pressure is generated in the gap 44 by the passage of the air or fluid flow over the composite shroud assembly 18–20 and the gap 44; which air or fluid flow partially evacuates the air or fluid from the gap 44 to create a partial vacuum therein. Consequently, the vacuum or negative pressure which forms in the gap 44 provides a force component acting in opposition to the forces which constitute the aerodynamic and mechanical load on the turbine 30. Therefore, as a result of the gap 44, a counterbalancing force inheres in the structure of the present invention to overcome or compensate for the forces acting to oppose rotation of the turbine 30. It should be noted that the size of the gap 44 is critical, although it may vary over an operative range.

The annular gap 44 between the fixed 18 and rotating shroud 20 should be made as narrow as possible consistant with mechanical tolerances so that the rotating section 20 does not interfere with the fixed section 18. In practice, this gap 44 will be on the order of .031 inch in width or about 1 to 2% of the total length of the composite shroud, of which length, shroud 18 makes up about ⅕ and shroud 20 about ⅘. It is important that the fixed portion 18 of this shroud at the gap 44 have dimensions ($T_1$, thickness) equal to or larger than the dimensions ($T_2$, thickness) of the rotating portion 20, as best seen in the lower portion of FIG. 1 in cross section.

For compressible fluids, such as air, the formula:

$$V=\sqrt{2P/p}$$

where:
V—Velocity
P—Pressure
p—Density will furnish velocity/pressure relations at any point.

For an airfoil moving relative to the air, the velocity/pressure relations along the length of a particular airfoil is usually empirically obtained in a wind tunnel. In an optimum configuration of the air speed meter, the cross section of the composite shroud (18–20) is similar to a symmetric airfoil section, with the angle of attack adjusted so that the velocity of the air passing over the outside of the shroud is essentially the same as the velocity of the air passing through the inside. The gap between the fixed 18 and rotating sections 20 of the composite shroud is located to coincide with the position of the maximum air velocity over the inside and the outside of the composite shroud. From the above formula this is also the position of the greatest pressure drop along the length of the shroud.

As in any airfoil, the magnitude of this pressure drop is a function of the air density, the airfoil thickness and chord, and its particular shape and the velocity of the relative air motion. Since the forward edge 20' of the rotating section 20 of the shroud is one of the surfaces creating the "gap," and this surface is subject to the reduced pressure developed by the airfoil shape of the whole shroud, the rotating section 20 will have a force exerted on it equal to the value of the reduced pressure times the area of the forward portion of the rotating section of the shroud. This force will be exerted in a direction opposite to the direction of the air flow and, therefore, opposite in direction to all of the accumulated drag forces of the turbine, thus reducing the load on the turbine bearings and permitting operation of the air speed meter at very high speeds. Regardless of the actual shape of the airfoil or the position of the gap, some "upstream" force will be developed for any air flow. There is an optimum configuration which can best be determined by wind tunnel analysis. The amount of "upstream" force on the turbine 30 can be controlled by varying the airfoil shape, in particular the thickness ($T_1$ and corresponding $T_2$) of the shroud. Increasing this thickness can increase the upstream force to the point where the bearings can be overloaded in the upstream direction instead of in the downstream direction, as is normally the case, due to the accumulated drag forces. The proportions shown are a reasonable compromise and have been found to provide the desired reduction in bearing loads necessary for high speed operation.

If the dimensions of the fixed section 18 of the shroud permit the air to impact any part of the forward edge or the rotating section 20, the resulting increase in pressure at the gap 44 will not only eliminate the "upstream" force effect, but exert a force in the downstream direction in addition to normal "drag" forces. Therefore, the gap surface of the fixed section 18 of the shroud should be somewhat larger than the gap surface of the rotating section 20. It has been found that about 1% in all dimensions is satisfactory for a gap having a width of about 1 to 2% of the width of the composite shroud.

It should be noted that if the turbine bearings 38, 40 are subjected to any appreciable thrust loading their resistance to rotation increases exponentially with a proportional decrease in length of service. If the thrust forces are not maintained within the allowable limits for the particular bearings used, they will fail and the instrument will be destroyed due to the high torsional forces which will develop.

The boundary layer (viscous drag) friction forces on the turbine 30 and its shroud (18–20) in the rotational direction are quite small compared with the rotational moment available from the turbine blades. Only the inner and outer surfaces of the rotating portion of the shroud 20 produce rotational drag forces and these are kept small by limiting the maximum rotational speed of the turbine 30 to about 7500 r.p.m. regardless of the relative axial air velocity by the proper choice of the turbine blade angle.

The axial drag forces on the other hand can be quite high since all of the surfaces of the turbine including the hub 34, both sides of each blade 32 and the inner and outer surfaces of the shroud 20 are subject to the downstream viscous drag and the relative axial velocity can be in excess of the speed of sound.

As noted previously the horizontally disposed fins 24 tend to stabilize the turbine assembly in the airstream and align the long axis of body 22 with the resultant of the forces acting on the meter which tend to deflect it with respect to the pitch axis of the aircraft. In still air, inasmuch as the turbine assembly T is pivoted at the pivot axis of pivot means 16 at the lower extremities of the arms of yoke 6 of the mounting means M the long axis of turbine assembly T will normally be parallel to the corresponding (pitch) axis of the aircraft only if the moments acting on the fore and aft portions of the turbine assembly are balanced. Inasmuch as the relatively bulky turbine 30, because of its larger surface area upon which vertically directed air forces may act, tends to overbalance the less bulky forward portion of the body 22 and nose 26, the fins 24 are provided to afford added surface area to the forward portion of the turbine assembly T. It will be appreciated that the horizontal surface of the fins compensates for the greater area of the turbine 30 as compared to the forward portion of the turbine assembly (body 22 and nose 26), thus tending to counterbalance moments on the turbine assembly due to vertical air flow. With these factors in mind, the fins 24 are designed to have an area and airfoil such as to counterbalance the turbine 30 and tend to keep the pitch axis of the turbine assembly parallel to the pitch axis of the aircraft when the resultant of the air flow forces is also parallel to those pitch axes.

The true air speed meter also includes an electromagnetic transducer adapted to convert the rotation of the turbine 30 to electrical pulses, and a portion of the means for transmitting the pulses to the instruments housed in the aircraft which ultimately analyze the pulses and convert them to true air speed readings. Basically, the electromagnetic transducer assembly is comprised of a disc magnet 48, an induction coil 50, a section 52 of the turbine mounting rod 28 made of magnetizable material, a fixed sleeve 54 of magnetizable material, a rotating sleeve 56 of magnetizable material attached to the turbine hub 34, and electrical conductors 58 threaded through the body 22, pivot means 16, arms of the yoke 6, and hollow shaft 4 and terminating in slip rings 8 in electrical contact with a brush block 60. A space 62 is located between the sleeve 54 and the sleeve 56 at a point wherein their ends are concentrically aligned, the rotating sleeve 56 being arranged within the fixed sleeve 54. Variability of the air space 62 is provided by the design of the aligned ends of the sleeves 54 and 56 seen in FIG. 4. Extending inwardly from the fixed sleeve 54 is an annular array of symmetrically disposed teeth 64, while the end of sleeve 56 terminates in another array of teeth 66. For illustrative purposes ten teeth 64 are shown extending inwardly from sleeve 54 while ten teeth 66 are shown on sleeve 56. With the array of teeth 64 arranged to overlie the teeth 66, a constant air space 62 exists in the magnetic circuit. However, as a turbine rotates, the turbine hub 34 and the sleeve 56 attached thereto rotate with respect to the fixed sleeve 54. Consequently, the air space 62 varies as the teeth 66 rotate with respect to the teeth 64, thereby varying the reluctance of the magnetic circuit and generating an electrical pulse in the coil 48. With ten rotating teeth 66, the reluctance varies ten times for each rotation of the turbine 30, consequently, ten electrical pulses are generated for each turbine rotation.

Conductors 58 extending from the coil 72 pass through the yoke 6, and mounting shaft 4 and terminate in slip rings 8 in electrical contact with a brush block 60 in the housing H. The brush block 60 is part of the electrical circuitry that connects the electro-magnetic transducer to the apparatus within the aircraft used to measure and display the true air speed. The use of slip rings 8 and a brush block 60 is desirable since the turbine mounting section M rotates freely about the axis aligned with the longitudinal axis of the mounting shaft 4. Conductors 68 which engage the slip rings 8 are inherently resilient and are biased against the slip rings 8 so that they are in constant engagement therewith regardless of the amount of rotation experienced by the shaft 4. A terminal plug 70 into which the conductors 68 extend is provided to connect the electro-magnetic transducer with the instruments in the aircraft which convert the electrical pulses generated by the transducer to true air speed. With the electromagnetic transducer of the present invention the rotor drag attributable to the torque imposed by the rotation measuring apparatus is virtually eliminated.

Regarding the conversion of the electrical pulses to true air speed, experimental data show that the relationship of air velocity to rotational speed of the turbine of the present invention is linear.

In operation, the true air speed meter of the present invention functions basically as an air turbine. Fluid flow of the medium through which the true air speed meter is passing causes the turbine 30 to rotate. As previously stated, the rotation of the turbine 30 is opposed by the boundary layer drag on shroud portion of the turbine 30, the friction of the bearings 38 and 40 mounting the turbine 30 and the torque of the measuring assembly. In the structure of the present invention, the bearings 38 and 40 and electro-magnetic transducer measuring the turbine rotation have been engineered to impose as little force against the turbine rotation as possible.

The negative pressure in the gap 44 is caused by the flow of air over the combination fixed and rotating shroud assembly 18, 20 which evacuates the air from the gap 44. The action of the flow of fluid over the gap 44 is similar in effect to that of an eductor. Consequently, the greater the velocity of the flow of fluid through the turbine and over the shroud the lower the pressure in the gap 44. Similarly, the greater the velocity of the flow of fluid, the greater the viscous drag on the turbine 30. Consequently, the structure of the present invention has the inherent character of providing a compensating force to counterbalance the viscous drag which varies directly with the magnitude of the relative velocity, i.e. the greater the magnitude of the drag forces on the turbine 30, the lower the negative pressure in the gap 44.

With the mounting arrangement M the turbine 30 must rotate to face directly into the composite or resultant force of all of the fluid forces acting on the aircraft, and by means of the synchro unit 72, convey that information to the pilot. Normally, during the cruise mode of an aircraft the turbine 30 will be oriented directly in line with the longitudinal axis of the aircraft.

True air speed is the speed at which an aircraft is moving with respect to the medium in which it is traveling. For example, if a helicopter is hovering over a fixed point, but facing into a wind force, its true air speed is the speed necessary to overcome the wind force and maintain zero ground speed. Similarly, if an aircraft is traveling with a tail wind aiding it, the ground speed will be greater than the true air speed to the extent of the tail wind.

A further benefit of the mounting arrangement M provided for the turbine 30 and the use of the synchro unit 72 is the wind direction information it can convey to the pilot during low speed cruise flight and during the hover mode. Any wind gusts which act on the aircraft during low speed cruise or hover will act on the turbine shroud 20 to rotate the turbine mounting M, vary the signal from the synchro unit 72 and thereby alert the pilot. With the increased use of hovering craft such as helicopters, GEMS (ground effect machines) and VTOL aircraft, it has become important to have a device capable of putting the pilot of such craft on immediate notice of wind gusts in the vicinity of the craft.

Because of the unique design of the present air speed meter, it is completely non-responsive to vertical air movement. Therefore, when the instrument is properly mounted on a helicopter at a location not affected by the turbulent ground air currents, and when the machine is being flown in a "hover" attitude at zero altitude during a period of no surface wind, the turbine 30 of the air speed instrument will not be rotating.

In the event surface wind is present, the helicopter must be operated so as to fly in a direction exactly opposite to and at exactly the same speed as the wind, in order to remain stationary over one position on the ground. In this case, the air speed meter will then be subjected to a horizontal air movement essentially equal in magnitude to the surface wind so that the turbine 30 will be caused to rotate and the wind velocity will be measured. Since the turbine 30 and its mounting M is free to turn about a vertical axis and the shroud 18, 20 of the turbine presents a large rudder area to the horizontal air motion, the instrument will turn to point in the direction the helicopter is "flying" to maintain its stationary ground position. A helicopter can fly sideways and backwards with apparently equal ease. Therefore, in the condition of zero altitude hover (zero ground speed) the air speed meter actually measures surface wind and its direction relative to the fore/aft center line of the helicopter.

In any other flying condition of the helicopter (motion over the ground at any altitude) the air speed meter will measure the actual or true air speed and the direction of the air movement relative to the fore/aft center line of the helicopter. If the air speed meter incorporates the pitch axis freedom, shown in FIG. 3 the instrument will also indicate the angle at which the helicopter is tilted with respect to the relative motion of the air past the helicopter. The pitch angle of any aircraft is related to the position of the center of gravity of the mechane, and therefore, is important to proper load placement and safe operation.

While the present invention has been described in connection with its use on aircraft and, particularly, helicopters, it will be apparent to those skilled in the art that it would be useful in many other applications, such as on naval ships, in meteorology, artillery and air speed reference instrumentation, for example, and that other embodiments in addition to those specifically described herein, within the spirit of the invention, would be apparent.

What is claimed is:

1. In apparatus disposable in a fluid medium for measuring the relative speed of movement of the fluid with respect thereto and comprising turbine rotor means rotatable on bearing means, the improvement wherein said turbine means includes a composite shroud, said composite shroud being composed of a forward fixed shroud and a rearward rotatable shroud including said turbine rotor means and bearing means, said fixed forward shroud having dimensions slightly greater than those of said rearward rotatable shroud, and said rotatable shroud being spaced from said fixed shroud to provide an air gap therebetween, whereby flow of fluid over and through said turbine means and said composite shroud produces a partial vacuum in said air gap between said fixed and rotatable shrouds, thus creating a force tending to counterbalance the axial thrust forces on said bearing means.

2. Apparatus according to claim 1, wherein said composite shroud has a cross section essentially that of an air foil.

3. Apparatus according to claim 1, wherein the turbine rotor means is comprised of a hub section and a plurality of blades extending from the hub section, and said rotatable shroud is attached to the tips of said blades.

4. Apparatus according to claim 1, including means for measuring the rotational speed of the turbine rotor means.

5. Apparatus according to claim 4, wherein the means for measuring the rotational speed comprises an electromagnetic transducer including a magnetic circuit with a variable air space therein, a source of magnetic energy, an induction coil, and means to measure the output of the induction coil, whereby the rotation of the turbine causes a predetermined number of variations in the air space for each rotation and the induction coil transmits an electrical pulse for each variation in the air space.

6. Apparatus according to claim 5, wherein the magnetic circuit in the electro-magnetic transducer includes a first fixed cylindrical sleeve having a plurality of inwardly projecting teeth at one end thereof and a second cylindrical sleeve fixedly secured to the turbine hub for rotation therewith, said second cylindrical sleeve having a plurality of teeth at one end, said inwardly projecting teeth of the first cylindrical sleeve concentrically overlying said plurality of teeth on the second sleeve to form the variable air space of the magnetic circuit, whereby rotation of said turbine rotor moves the teeth of the second sleeve into and out of proximity with the teeth on the first sleeve to vary the air space in the magnetic circuit.

7. An apparatus in accordance with claim 6, wherein said first and second sleeves each have ten equally spaced teeth.

8. An apparatus in accordance with claim 1, wherein the turbine rotor means is mounted on a vehicle so as to be free to rotate 360° with respect to the yaw axis of said vehicle and to pivot relative to the pitch axis of said vehicle and wherein said turbine means is balanced with respect to the moments around its center of gravity.

9. Apparatus according to claim 1, including means to measure deflection of said turbine rotor means with respect to the yaw and pitch axes of a vehicle on which said apparatus is mounted.

10. Apparatus according to claim 9, in which an upstream force on the turbine is developed by said rotatable shroud which encloses the turbine blades, said fixed shroud operating together with said rotatable shroud to develop a reduced relative pressure at said gap between the shroud members as a result of the pressure/velocity relation of moving fluids.

References Cited
UNITED STATES PATENTS
3,287,969  11/1966  Hardy _____ 73—187

DONALD O. WOODIEL, Primary Examiner

U.S. Cl. X.R.

73—189